(12) United States Patent
Uchino et al.

(10) Patent No.: US 11,086,371 B2
(45) Date of Patent: Aug. 10, 2021

(54) HEAT SUPPRESSION IN AN INFORMATION PROCESSING DEVICE IN AN INITIAL SETTING MODE

(71) Applicant: LENOVO (Singapore) PTE. LTD., New Tech Park (SG)

(72) Inventors: Akinori Uchino, Yokohama (JP); Toyoaki Inada, Yokohama (JP); Yusaku Morishige, Yokohama (JP); Kazuhiro Kosugi, Yokohama (JP); Hajime Yoshizawa, Yokohama (JP); Yuhsaku Sugai, Yokohama (JP); Hiroki Oda, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 124 days.

(21) Appl. No.: 16/419,417

(22) Filed: May 22, 2019

(65) Prior Publication Data

US 2019/0377393 A1    Dec. 12, 2019

(30) Foreign Application Priority Data

Jun. 6, 2018  (JP) .............................. JP2018-109032
Sep. 12, 2018 (JP) .............................. JP2018-170901

(51) Int. Cl.
  *G06F 1/20*       (2006.01)
  *G06F 1/3287*     (2019.01)
  *G06F 9/4401*     (2018.01)

(52) U.S. Cl.
  CPC ............ *G06F 1/206* (2013.01); *G06F 1/3287* (2013.01); *G06F 9/4406* (2013.01)

(58) Field of Classification Search
  CPC ...... G06F 1/206; G06F 1/3287; G06F 1/4406; G06F 9/4406
  See application file for complete search history.

(56) References Cited

U.S. PATENT DOCUMENTS

2003/0110423 A1*  6/2003  Helms ..................... G06F 1/206
                                                     714/100
2007/0113109 A1*  5/2007  Kim ........................ G06F 1/206
                                                     713/300

(Continued)

FOREIGN PATENT DOCUMENTS

JP      2004260112 A    9/2004
JP      2007041739 A    2/2007

(Continued)

*Primary Examiner* — Vincent H Tran
(74) *Attorney, Agent, or Firm* — Kunzler Bean & Adamson

(57) ABSTRACT

An apparatus for heat suppression in an initial setting mode includes, in one embodiment, an execution unit of an information processing device that executes an operation related to an initial setting mode of the information processing device, a power supply that supplies power to one or more heat generating components of the execution unit, and a controller that controls at least the power supplied by the power supply to make an amount of heat generation of the execution unit in the initial setting mode lower than the amount of heat generation of the execution unit in an operating mode after termination of the initial setting mode until fulfillment of a predetermined condition. A method and a computer program product also perform functions of the apparatus.

14 Claims, 6 Drawing Sheets

(56) References Cited

U.S. PATENT DOCUMENTS

| | | | | |
|---|---|---|---|---|
| 2007/0143763 A1* | 6/2007 | Adachi | ............... | G06F 1/206 |
| | | | | 718/104 |
| 2007/0271477 A1* | 11/2007 | Brewer | ............... | G06F 1/3203 |
| | | | | 713/324 |
| 2010/0030395 A1* | 2/2010 | Shimotono | ............ | G06F 1/206 |
| | | | | 700/300 |
| 2010/0191936 A1* | 7/2010 | Khatri | ............... | G06F 11/3495 |
| | | | | 712/42 |
| 2012/0036385 A1* | 2/2012 | Faasse | ............... | G06F 1/3206 |
| | | | | 713/340 |
| 2012/0271480 A1* | 10/2012 | Anderson | ............ | G06F 1/3206 |
| | | | | 700/299 |
| 2014/0006765 A1* | 1/2014 | Saito | ............... | G06F 21/572 |
| | | | | 713/2 |
| 2014/0108694 A1* | 4/2014 | Chung | ............... | G06F 1/3243 |
| | | | | 710/303 |
| 2015/0338892 A1* | 11/2015 | Culbert | ............... | G06F 1/3296 |
| | | | | 713/323 |
| 2019/0041923 A1* | 2/2019 | Atsatt | ............... | H03K 19/0008 |

FOREIGN PATENT DOCUMENTS

| | | | |
|---|---|---|---|
| JP | 2007065870 A | 3/2007 | |
| JP | 2007066060 A | 3/2007 | |
| JP | 2011022669 A | 2/2011 | |

* cited by examiner

200

| | CHASSIS SURFACE TEMPERATURE [°C] | DRIVING SOUND [dB] | UPPER LIMIT POWER OF CPU [W] | PROCESSING TIME IN INITIAL SETTING MODE [s] |
|---|---|---|---|---|
| NORMAL MODE | T1 | V1 | W1 | — |
| INITIAL SETTING MODE (1) | T2 | V2 | W2 | R1 |
| INITIAL SETTING MODE (2) | T3 | V3 | W3 | R2 |

HEAT SUPPRESSION IN AN INFORMATION PROCESSING DEVICE IN AN INITIAL SETTING MODE

FIELD

The subject matter disclosed herein relates to information processing devices and more particularly relates to an apparatus, method, and computer program product for heat suppression in an information processing device in an initial setting mode.

BACKGROUND

An information processing device such as a laptop Personal Computer ("PC") requires a user who purchased the laptop PC to perform predetermined processing, such as Out-Of-Box Experience ("OOBE") or user registration processing in an initial setting mode on first boot. In addition to the predetermined processing in the initial setting mode, this information processing device may also require Windows® update, a security check, or the like depending on the state of the laptop PC. Various components of the information processing device such as the processors, storage devices, network adapters and so forth generate heat in the initial setting mode.

SUMMARY

An apparatus for heat suppression in an information processing device in an initial setting mode is disclosed. In one embodiment, the apparatus includes an execution unit of an information processing device that executes an operation related to an initial setting mode of the information processing device, a power supply that supplies power to one or more heat generating components of the execution unit, and a controller that controls at least the power supplied by the power supply to make an amount of heat generation of the execution unit in the initial setting mode lower than the amount of heat generation of the execution unit in an operating mode after termination of the initial setting mode until fulfillment of a predetermined condition.

In various embodiments, the predetermined condition is fulfilled in response to the execution unit terminating processing related to a system configuration of the information processing device. In some embodiments, the predetermined condition is fulfilled in response to a period for the execution unit to perform initial setting mode processing, elapsing. In certain embodiments apparatus includes a processor that performs initial setting mode processing, and the controller controls the power supply to make the power supplied to the processor lower than a reference power until the fulfillment of the predetermined condition. In some embodiments, the execution unit includes a cooling fan that cools the processor, and the controller controls the cooling fan to make a maximum rotational speed of the cooling fan lower than a reference upper limit rotational speed until the fulfillment of the predetermined condition.

In certain embodiments, the period for performing initial setting mode processing is set to a predetermined period after a first boot of the information processing device that includes booting an operating system in an initial state. In one embodiment, in response to the information processing device transitioning to a predetermined power-saving mode, the controller supplies, to the execution unit, power set in the predetermined power-saving mode including during the period for performing initial setting mode processing.

In various embodiments, the power supplied is set to limit a required increase in time for the processor to complete the initial setting mode processing with respect to a required time to supply the reference power to the processor in order to complete the initial setting mode processing to 10% or less. In some embodiments, the power supplied is 70% of the reference power or more. In certain embodiments, the controller controls the power supplied so that an increase in time required for the processor to complete the initial setting mode with respect to the time required to supply the reference power to the processor in order to complete the initial setting mode falls within a predetermined range.

A method for heat suppression in an information processing device in an initial setting mode is disclosed. In one embodiment, the method includes determining an amount of heat generation in an execution unit of an information processing device in an initial setting mode and in a different operating mode after termination of the initial setting mode, detecting a temperature of one or more heat generating components of the execution unit in the initial setting mode, and controlling at least power supplied to the execution unit to make a first amount of heat generation of the execution unit in the initial setting mode lower than a second amount of heat generation of the execution unit in the different operating mode after termination of the initial setting mode until fulfillment of a predetermined condition.

In various embodiments, the predetermined condition is fulfilled in response to the execution unit terminating processing related to a system configuration of the information processing device. In some embodiments, the predetermined condition is fulfilled in response to a period for performing initial setting mode processing, elapsing.

In certain embodiments, the method includes performing, using a processor of the execution unit, initial setting mode processing, and controlling the power supplied to the processor to be lower than a reference power until the fulfillment of the predetermined condition. In some embodiments, the method includes controlling a cooling fan for cooling the execution unit to make a rotational speed of the cooling fan lower than a reference upper limit rotational speed until the fulfillment of the predetermined condition. In various embodiments, the method includes setting the period for performing initial mode processing to a predetermined period after a first boot of the information processing device that includes booting an operating system in an initial state.

In some embodiments, the method includes controlling the power supplied to the execution unit in response to the information processing device transitioning to a predetermined power-saving mode including during the period for performing initial setting mode processing. In various embodiments, the method includes controlling the power supplied to limit a required increase in time for the processor to complete the initial setting mode with respect to a required time to supply the reference power to the processor in order to complete the initial setting mode to 10% or less. In certain embodiments, the method includes controlling the power supplied to be 70% of the reference power or more.

A program product for heat suppression in an information processing device in an initial setting mode is disclosed. In one embodiment, the program product includes a computer readable storage medium that stores code executable by a processor, the executable code including code to determine an amount of heat generation in an execution unit of an information processing device in an initial setting mode and in a different operating mode after termination of the initial setting mode, detect a temperature of one or more heat generating components of the execution unit in the initial setting mode; and control at least power supplied to the execution unit to make a first amount of heat generation of the execution unit in the initial setting mode lower than a second amount of heat generation of the execution unit in the different operating mode after termination of the initial setting mode until fulfillment of a predetermined condition.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

An information processing device, a control method, and a program, to which the present invention is applied, will be described below with reference to the accompanying drawings. Embodiments to be described below are such that, when the information processing device is first booted, operation related to an initial setting mode is executed by an execution unit, and at least a power circuit is controlled, until a predetermined condition is fulfilled, so that the amount of heat generation of the execution unit in the initial setting mode will be lower than the amount of heat generation of the execution unit in an operating mode after termination of the initial setting mode. The execution unit is each unit, such as a CPU, a network card, a storage, or a charging circuit, which operates in the initial setting mode to generate heat.

In one embodiments, an information processing device includes a fan drive control device capable of driving a fan upon a steep increase in central processor ("CPU") load factor while reducing the generation of noise of the fan. The fan drive control device drives a fan for cooling the electronic equipment inside the information processing device (e.g., a CPU). The fan drive control device includes a switch for turning on/off the driving power of the fan, a temperature detection integrated circuit ("IC") for detecting an internal temperature of the electronic equipment and controlling an on/off switching based on the detected value, and calculates the CPU load factor using software so that the CPU controls the switching the fan on/off based on the value calculated by the load factor calculating means.

Figure 1:
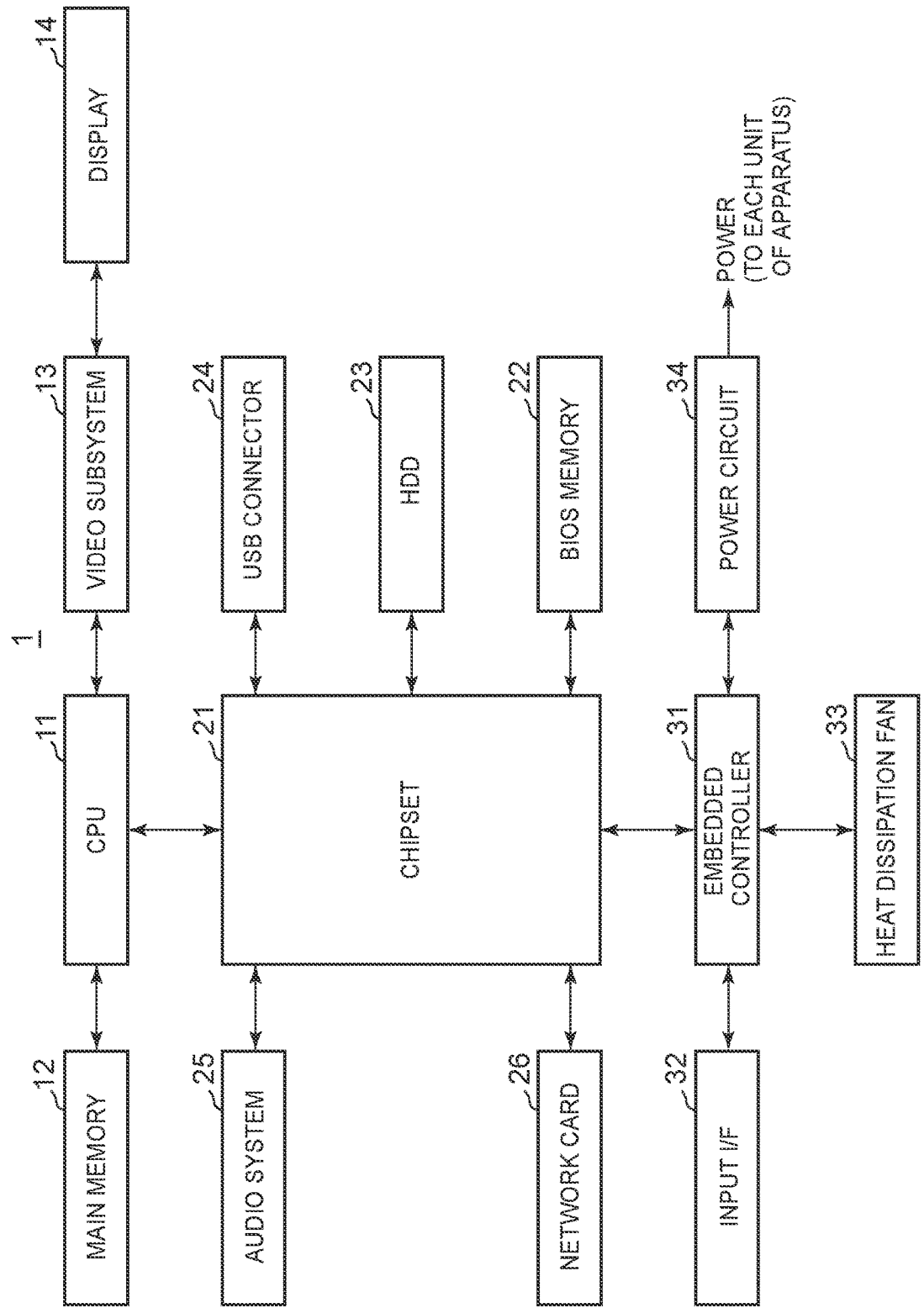
FIG. 1 is a schematic block diagram illustrating one embodiment of an example hardware configuration for an apparatus for heat suppression in an information processing device in an initial setting mode.

FIG. 1 is a schematic block diagram illustrating one embodiment of a hardware configuration for an apparatus for heat suppression in an information processing device 1 in an initial setting mode. In the embodiment, the information processing device 1 is depicted as a laptop PC, a tablet terminal, or the like but may be any other type of information processing device.

For example, in one embodiment, the information processing device 1 includes a CPU 11, a main memory 12, a video subsystem 13, a display 14, a chipset 21, a Basic Input Output System ("BIOS") memory 22, an Hard Disk Drive ("HDD") 23, a Universal Serial Bus ("USB") connector 24, an audio system 25, a network card 26, an embedded controller 31, an input interface 32, a heat dissipation fan 33, and a power circuit 34.

In the embodiment, the CPU 11 performs various arithmetic processing, for example, by executing programs stored in the main memory 12 to control each unit of the information processing device 1. The CPU 11 is an example of a processor. The main memory 12 includes, for example, a plurality of Dynamic Random Access Memory ("DRAM") chips. The main memory 12 functions as a reading area of the programs executed by the CPU 11. The main memory 12 also functions as a working area into which processing data of the programs executed by the CPU 11 are written. The programs executed by the CPU 11 include, for example, an Operating System ("OS"), various drivers for hardware operations of peripheral devices, various services/utilities, application programs, and the like.

In various embodiments, the video subsystem 13 includes, for example, a video controller and a video memory. The video subsystem 13 is a subsystem for implementing functions related to image display. The video controller processes drawing instructions output from the CPU 11 and writes processed drawing information into the video memory. Further, the video controller reads the drawing information from the video memory, and outputs, to the display 14, the read drawing information as drawing data (e.g., display data). The display 14 is, for example, a liquid crystal display. The display 14 provides a display screen based on the drawing data (display data) output from the video subsystem 13.

In certain embodiments, the chipset 21 includes controllers, such as a USB, a serial AT Attachment ("ATA") bus, a Serial Peripheral Interface ("SPI") bus, a Peripheral Component Interconnect ("PCI") bus, a PCI-Express bus, and a Low Pin Count ("LPC") bus. Plural devices are connected to the chipset 21. In the embodiment, the BIOS memory 22, the HDD 23, the USB connector 24, the audio system 25, the network card 26, and the embedded controller 31 as devices are connected to the chipset 21.

In one embodiment, the BIOS memory 22 is, for example, an Electrically Erasable Programmable Read Only Memory ("EEPROM") or an electrically rewritable nonvolatile memory such as a flash ROM. The BIOS memory 22 stores parameters, system firmware, and the like to control the BIOS, the embedded controller 31, and the like.

In various embodiments, the information processing device 1 includes a nonvolatile storage device, such as for example, the HDD 23. The HDD 23 stores the OS, various drivers, various services/utilities, application programs, and various kinds of data. In certain embodiments, the information processing device 1 include the USB connector 24 which is a connector for connecting each of peripheral devices using USB to the information processing device 1. The audio system 25 performs recording, playback, and input/output of sound data. The network card 26 connects to a network to perform data communication. For example, the network card 26 may connect to the network through a wireless LAN.

In various embodiments, the embedded controller 31 is a one-chip microcomputer for monitoring and controlling various devices (e.g., peripheral devices, sensors, and the like) regardless of the operating mode of the information processing device 1. The embedded controller 31 as the one-chip microcomputer includes a CPU, a read-only memory ("ROM"), a random access memory ("RAM"), a multi-channel analog-to-digital ("A/D") input terminal, a digital-to-analog ("D/A") output terminal, a timer, and a digital input/output ("I/O") terminal, which are not illustrated. To the digital input/output terminal of the embedded controller 31, for example, an input interface 32, a heat dissipation fan 33, and a power circuit 34 are connected.

The embedded controller 31 has a power management function to control the power circuit 34. The embedded controller 31 controls the power circuit 34 to control the value of driving power supplied to the CPU 11, for example.

The embedded controller 31 controls the power circuit 34 according to predetermined operating modes of the information processing device 1. For example, the predetermined operating modes include an initial processing mode, an initial start-up mode, a normal mode, and a power-saving mode. The operating mode of the information processing device 1 makes a transition to any of the initial processing mode, the initial start-up mode, the normal mode, and the power-saving mode in response to an event trigger. Note that the operating mode of the information processing device 1 may be an operating mode defined in the Advanced Configuration and Power Interface ("ACPI") specification.

In one embodiment, the initial processing mode is an operating mode to which the transition is made in response to such an event trigger that a user first boots the information processing device 1 after purchasing the information processing device 1. An OOBE mode is an example of the initial processing mode.

The initial start-up mode is, for example, an operating mode to which the transition is made in response to such an event trigger that the initial processing mode is terminated. In the initial start-up mode, for example, user registration processing, program installation processing, and the like are included.

The normal mode is, for example, an operating mode to which the transition is made in response to such an even trigger that the initial start-up mode is terminated. The normal mode is the most active state, i.e., the normal operating state.

The power-saving mode is an operating mode to run the CPU 11 with a power consumption value lower than the normal mode. For example, the power-saving mode is to run the CPU 11 with low power consumption capable of returning to the normal mode quickly. A standby mode is, for example, a modern standby mode, which is an example of the power-saving mode. In the modern standby mode, a state of performing a background processing and a hibernation state are switched and used in a display-off (halting) state of the display 14. Note that the power-saving mode may be a shut-down state (e.g., power off state) in which the power is turned off by software, or the hibernation state as a quiescent state in which a work content is saved to the HDD 23 or the like.

In some embodiments, the information processing device includes the input interface 32 which is an input device, such as a keyboard, a pointing device, or a touch pad.

In one embodiment, the power circuit 34 includes, for example, a direct current-to-direct current ("DC/DC") converter, a charge/discharge unit, a battery unit, an alternating current-to-direct current ("AC/DC") adapter, and the like. The power circuit 34 is an example of a. The power circuit 34 operates under the control of the embedded controller 31. The power circuit 34 converts DC voltage supplied from the AC/DC adapter or the battery unit into voltage to operate the information processing device 1. The power circuit 34 supplies the converted voltage power to each unit of the information processing device 1.

In certain embodiments, the heat dissipation fan 33 includes a fan, a motor, and the like. The heat dissipation fan 33 is an example of a cooling fan. The heat dissipation fan 33 operates under the control of the embedded controller 31. The heat dissipation fan 33 suppresses the transmission of heat, generated by the CPU 11, to the chassis surface of the information processing device 1. The chassis surface of the information processing device 1 is, for example, an area that the user can touch. Note that the heat dissipation fan 35 is stopped in the modern standby mode.

Figure 2:
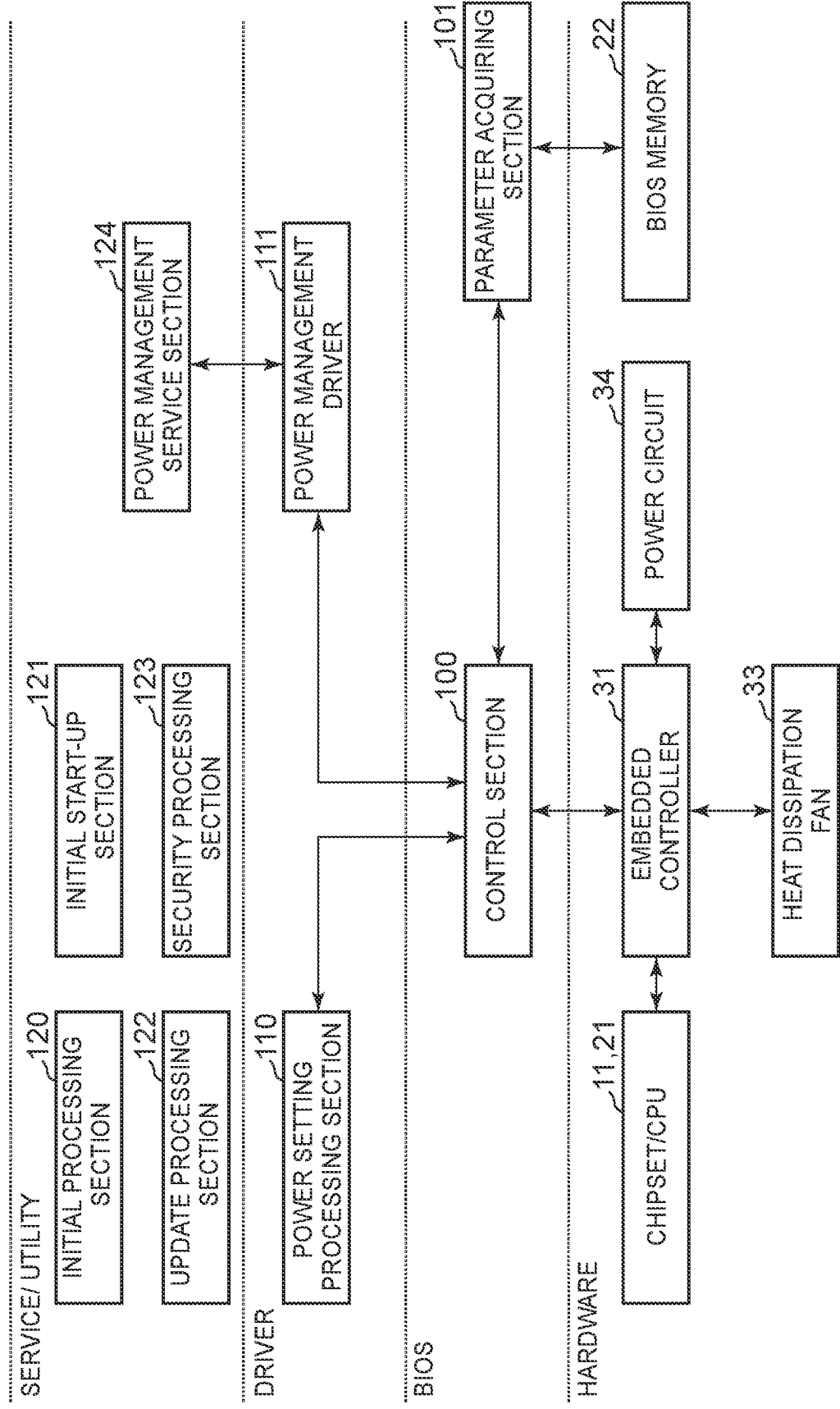
FIG. 2 is a schematic block diagram illustrating one embodiment of an example functional configuration for an apparatus for heat suppression in an information processing device in an initial setting mode.

FIG. 2 is a schematic block diagram illustrating one embodiment of an example functional configuration for an apparatus for heat suppression in an information processing device 1 in an initial setting mode. The information processing device 1 includes, for example, a control section 100, a parameter acquiring section 101, a power setting processing section 110, a power management driver 111, an initial processing section 120, an initial start-up section 121, an update processing section 122, a security processing section 123, and a power management service section 124. The control section 100, the parameter acquiring section 101, the power setting processing section 110, the power management driver 111, the initial processing section 120, the initial start-up section 121, the update processing section 122, the security processing section 123, and the power management service section 124 are implemented, for example, by a processor such as the CPU 11 executing programs stored in the HDD 23, the main memory 12, and the like. These sections may also be implemented by hardware (e.g., circuitry) such as Large Scale Integration (LSI), Application Specific Integrated Circuit ("ASIC"), Field-Programmable Gate Array ("FPGA"), or the like, or implemented by software in cooperation with hardware.

Further, in FIG. 2, SERVICE/UTILITY, DRIVER, and BIOS are implemented by the CPU 11 reading, into the main memory 12, and executing the programs stored in the HDD 23 or the BIOS memory 22. Here, the initial processing section 120, the initial start-up section 121, the update processing section 122, the security processing section 123, and the power management service section 124 correspond to SERVICE/UTILITY, the power setting processing section 110 and the power management driver 111 correspond to DRIVER, and the control section 100 and the parameter acquiring section 101 correspond to BIOS.

In one embodiment, the initial processing section 120 runs in the initial processing mode. The initial start-up section 121 runs in the initial start-up mode. The update processing section 122 and the security processing section 123 run in the normal mode. The update processing section 122 performs processing for updating software in the information processing device 1. The security processing section 123 performs processing for checking security in the information processing device 1 and processing related to security based on the checking result.

In various embodiments, the power management service section 124 provides a service for power management (e.g., power consumption management). For example, the power management service section 124 outputs, to the power management driver 111, an instruction to change the operating mode in response to an event trigger to change the operating mode.

The power management driver 111 is, for example, an Advanced ACPI driver. The power management driver 111 manages the power consumption of the information processing device (laptop PC) 1 according to the operating mode. The power management driver 111 controls the control section 100 in response to accepting an instruction to change the operating mode from the power management service section 124.

The control section 100 is, for example, Dynamic Thermal Control ("DYTC") ACPI interface ("I/F") method. The control section 100 instructs the embedded controller 31 to perform control, and the power setting processing section 110 to change the upper limit of power consumption in the CPU 11. The upper limit of power consumption means, for example, a settable power consumption level called "Power Limit," i.e., the upper limit of power consumption that the CPU 11 can consume per unit time. The control section 100 instructs the embedded controller 31 to change power supplied from the power circuit 34 to the CPU 11. Further, the control section 100 instructs the embedded controller 31 to change the rotational speed of the heat dissipation fan 35.

In certain embodiments, the power management service section 124, the power management driver 111, and the control section 100 correspond to a mode control section. The mode control section makes a transition of the operating mode of the information processing device 1 to any of the initial processing mode, the initial start-up mode, the normal mode, and the power-saving mode described above.

Figure 3:
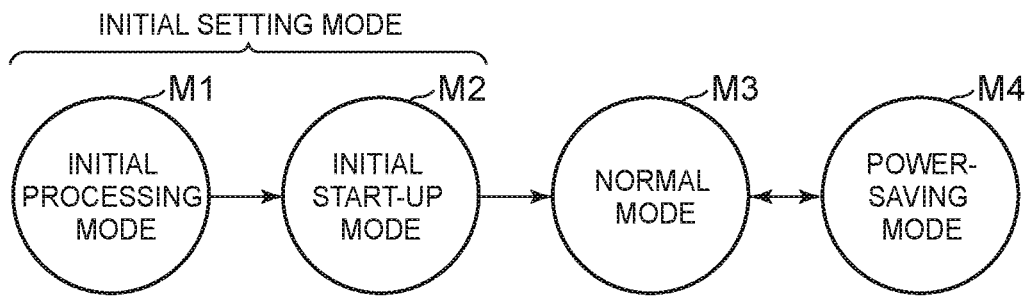
FIG. 3 is a diagram illustrating one embodiment of operating modes of the information processing device of FIG. 1 and/or FIG. 2.

FIG. 3 is a diagram illustrating one embodiment of operating modes of the information processing device of FIG. 1 and/or FIG. 2. Each of the operating modes of the information processing device 1 makes a transition to any of an initial setting mode including an initial processing mode M1 and an initial start-up mode M2, a normal mode M3, and a power-saving mode M4. The information processing device 1 makes a transition to the initial start-up mode M2 in response to such an event trigger that the initial processing mode M1 is terminated. The information processing device 1 makes a transition to the normal mode M3 in response to such an event trigger that the initial start-up mode M2 is terminated. Then, when a predetermined event trigger has occurred in the normal mode M3, the information processing device 1 makes a transition to the power-saving mode M4. The predetermined event trigger is, for example, that the information processing device 1 is not operated over a predetermined period of time. Then, when a predetermined event trigger has occurred in the power-saving mode M4, the information processing device 1 makes a transition to the normal mode M3. The predetermined event trigger is, for example, a predetermined event in the detection of a user's action or in the background processing. The user's action is, for example, that the user holds a power button down or that an operation on the input interface 32 is accepted. The occurrence of the predetermined event in the background processing is, for example, that a mail is received, or the like.

The control section 100 controls the power circuit 34 to make upper limit power supplied to the CPU 11 lower than reference power during a period for performing initial setting mode processing. The period for performing the initial setting mode processing is a predetermined period after the information processing device 1 including an operating system in the initial state is first booted, which is several days, but the present invention is not limited to this period. The reference power is, for example, upper limit power supplied to the CPU 11 in the normal mode.

A lapse of the period in which the initial setting mode processing is expected to be performed is an example of fulfillment of a predetermined condition. Further, controlling the power circuit 34 to make the upper limit power supplied to the CPU 11 lower than the reference power is an example of controlling at least the power circuit 34 to make the amount of heat generation of the execution unit in the initial setting mode lower than the amount of heat generation of the execution unit in an operating mode after termination of the initial setting mode.

The upper limit power supplied to the CPU 11 in the initial setting mode may be so set that the degree of increase in time required for the CPU 11 to complete the initial setting mode with respect to the time required to supply the reference power to the CPU 11 in order to complete the initial setting mode will be 10% or less.

The upper limit power supplied to the CPU 11 in the initial setting mode may be set with respect to the reference power so that the upper limit power supplied to the CPU 11 during the period in which the CPU 11 is expected to perform initial setting mode processing will be 70% of the reference power or more.

Further, the information processing device 1 may determine the upper limit power so that the degree of increase in time required for the CPU 11 to complete the initial setting mode with respect to the time required to supply the reference power to the CPU 11 in order to complete the initial setting mode will be a predetermined degree or less.

The control section 100 controls the heat dissipation fan 33 to make an upper limit rotational speed of the heat dissipation fan 33 lower than a reference upper limit rotational speed during the period in which the CPU 11 is expected to perform the initial setting mode processing. Note that the control section 100 may control the volume of driving sound instead of the rotational speed. The reference upper limit rotational speed is, for example, an upper limit rotational speed of the heat dissipation fan 33 in the normal mode.

The power setting processing section 110 is, for example, a Dynamic Platform and Thermal Framework ("DPTF") driver. The power setting processing section 110 sets the upper limit of the power consumption of the CPU 11 under the control of the control section 100. For example, the power setting processing section 110 changes the setting of the upper limit of the power consumption in the CPU 11 based on an instruction from the control section 100.

Figure 4:
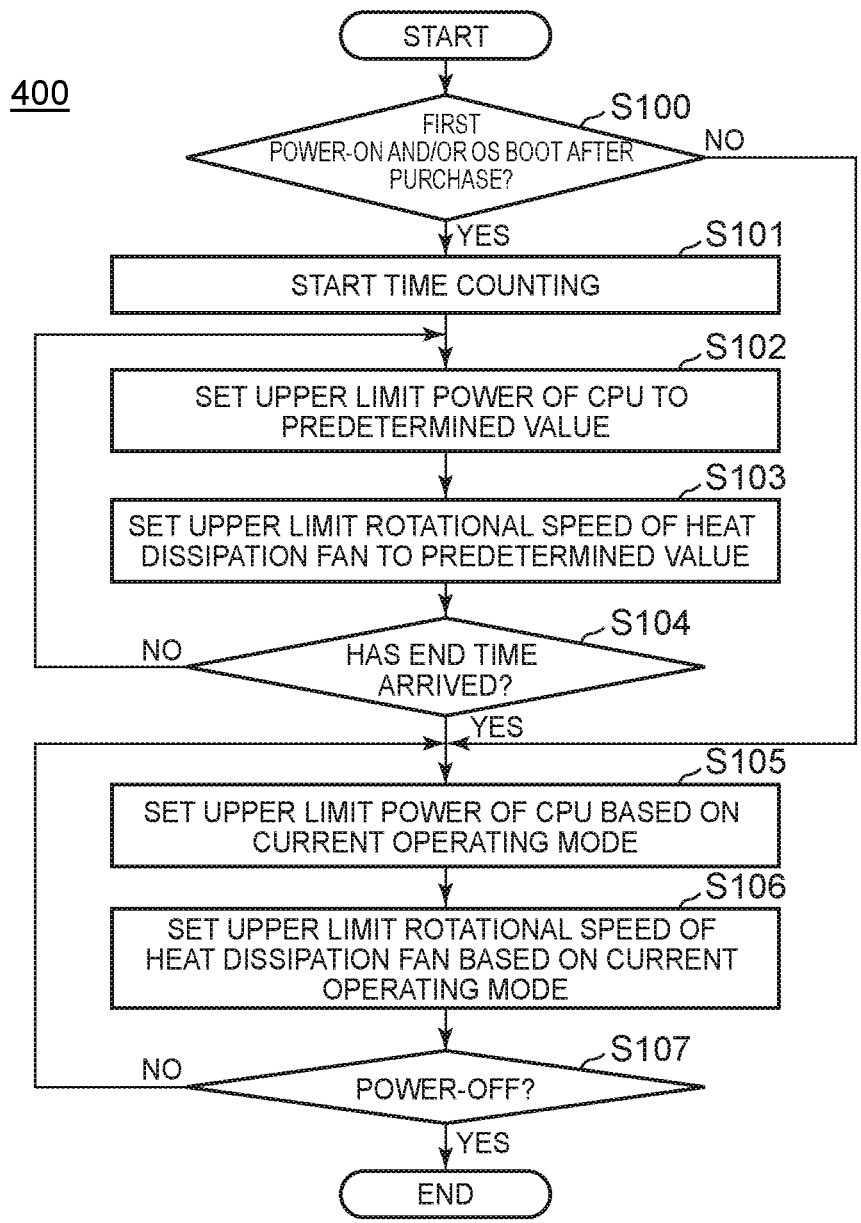
FIG. 4 is a flowchart diagram illustrating one embodiment of a method of controlling the power consumption of a CPU and the rotational speed of a heat dissipation fan.

FIG. 4 is a flowchart diagram illustrating one embodiment of a method 400 of controlling the power consumption of a CPU and the rotational speed of a heat dissipation fan. In one embodiment, the method 400 begins and determines 5100 whether an event trigger as first power-on after purchase has occurred. If the event trigger as a first power-on after purchase has not occurred ("No"), the method 400 proceeds to S105. When the event trigger as first power-on after purchase has occurred ("Yes"), the method proceeds to S101.

In step S101, the method 400 starts time counting. Next, the method 400 sets S102 the upper limit power of a CPU (e.g., the CPU 11) to a predetermined value. As described above, the upper limit power set to the predetermined value is power lower than the reference power. Next, the method 400 sets S103 the upper limit rotational speed of a heat dissipation fan (e.g., heat dissipation fan 33) to a predetermined value. As described above, the upper limit rotational speed is a rotational speed lower than the reference rotational speed.

Note that, in S102, the method 400 may suppress the heat generation of the network card 26 or a storage device such as the HDD 23 as the execution unit. The information processing device 1 may limit the upper limit power or suppress the communication speed to suppress the heat generation of the network card 26. The information processing device 1 may also limit the upper limit power or the data processing rate to suppress the heat generation of the storage such as the HDD 23.

Further, in certain embodiments, the method 400 controls various execution units such as the CPU 11, the network card 26, and the storage like the HDD 23 comprehensively to suppress the heat generation of the entire apparatus. For example, the information processing device 1 may suppress the heat generation of the network card 26 preferentially during a period when downloading a file in OS update processing, suppress the heat generation of the storage such as the HDD 23 preferentially during a period when storing downloaded data in the storage such as the HDD 23, and suppress the heat generation of the CPU 11 preferentially during an updating period.

Next, the method 400 determines S104 whether the end time has arrived. When the counted time exceeds the period in which the CPU 11 is expected to perform the initial setting mode processing, the method 400 determines that the end time has arrived. When the end time has not arrived yet ("No"), the method 400 continues and repeats S102 and S103. When the end time has arrived ("YES"), the method 400 proceeds to S105.

The method 40 sets S105 the upper limit power of the CPU 11 based on a current operating mode. Next, the information processing device 1 sets 106 the upper limit rotational speed of the heat dissipation fan 33 based on the current operating mode (step S106). Then, the method 400 determines S107 whether an event trigger as power-off has occurred. When the event trigger as power-off has not occurred ("No"), method 400 returns to S105. When the event trigger as power-off has occurred ("Yes") the method 400 ends.

In various embodiments, the information processing device 1 performs the method 400 and may set the upper limit power of the CPU 11 and the upper limit rotational speed of the heat dissipation fan 33 based on parameters acquired by the parameter acquiring section 101.

Figures 5, 6:
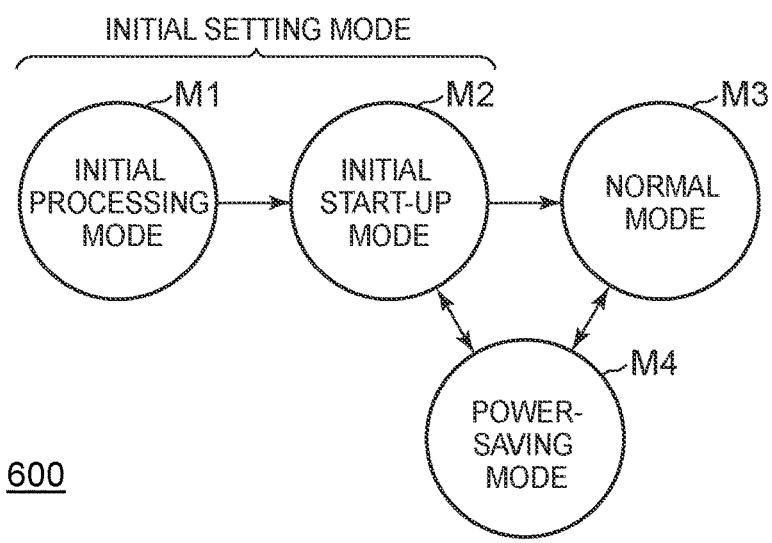
FIG. 5 is table illustrating one embodiment of parameters used for heat suppression in an information processing device in an initial setting mode for the operating modes embodiment depicted in FIG. 3.
FIG. 6 is a diagram illustrating another embodiment of operating modes of the information processing device.

FIG. 5 is table illustrating one embodiment of parameters 200 used for heat suppression in an information processing device in an initial setting mode for the operating modes embodiment depicted in FIG. 3. The parameters 200 are illustrated in a table format, for example, which express the relations between each of operating modes, and chassis surface temperature (T1, T2, T3), driving sound (V1, V2, V3), upper limit power of CPU (W1, W2, W3), and processing time (R1, R2) in the initial setting mode. The control section 100 extracts, from the parameters 200, upper limit power of the CPU 11 corresponding to the current operating mode. The control section 100 also extracts, from the parameters 200, driving sound corresponding to the current operating mode, and controls the heat dissipation fan 33 to operate at a rotational speed corresponding to the driving sound.

Further, the information processing device 1 extracts, from the parameters 200, processing time in the initial setting mode, and determines whether the period in which the CPU 11 is expected to perform the initial setting mode processing is terminated.

Set in the parameters 200 may be the chassis surface temperature, the driving sound, the upper limit power of the CPU, and the processing time in the initial setting mode corresponding to the initial setting mode (1), and the chassis surface temperature, the driving sound, the upper limit power of the CPU, and the processing time in the initial setting mode corresponding to the initial setting mode (2), but the parameters are not limited to those, and still more pieces of information may be stored. The initial setting mode (1) and the initial setting mode (2) are different from each other, for example, in chassis surface temperature, driving sound, upper limit power of the CPU, and processing time in the initial setting mode.

As described above, the information processing device 1 of the first embodiment includes the CPU 11 which performs initial setting mode processing of the own apparatus, the power circuit 34 which supplies power to the CPU 11, and the control section 100 which controls the power circuit 34 to make the upper limit power supplied to the CPU 11 lower than the reference power during the period in which the CPU 11 is expected to perform the initial setting mode processing. Thus, according to the information processing device 1, heat generation in the initial setting mode of the information processing device 1 can be suppressed. For example, when processing by the update processing section 122 and processing by the security processing section 123 in the initial setting mode of the information processing device 1 are started in parallel, excessive heat generation can be suppressed.

Further, according to the information processing device 1, the heat dissipation fan 33 is so controlled that the upper limit rotational speed of the heat dissipation fan 33 will be lower than the reference upper limit rotational speed during the period in which the CPU 11 is expected to perform the initial setting mode processing. Thus, according to the information processing device 1, driving sound in the initial setting mode of the information processing device 1 can be suppressed.

In one embodiment, both the upper limit power of the CPU 11 and the upper limit rotational speed of the heat dissipation fan 33 are suppressed during the period in which the CPU 11 is expected to perform the initial setting mode processing, but the present invention is not limited thereto, and at least either of the upper limit power of the CPU 11 and the upper limit rotational speed of the heat dissipation fan 33 may be suppressed.

Further, in some embodiments, the heat generation of the CPU 11 is suppressed, but the present disclosure is not limited thereto, and power to the network card 26 or the storage such as the HDD 23 are examples of execution units in which heat generated in the initial setting mode may be suppressed.

FIG. 6 is a diagram illustrating another embodiment of operating modes 600 of the information processing device. In such an embodiment, the information processing device 1 is different from the information processing device 1 of the above-described embodiments in that, when the information processing device 1 makes a transition to a predetermined power-saving mode, power set in the power-saving mode is supplied to the CPU 11 even during the period in which the CPU 11 is expected to perform the initial setting mode processing. In one embodiment, this operation may be performed by the control section 100. The predetermined power-saving mode is an operating mode in which the upper limit power supplied to the CPU 11 is lower than the reference power. The predetermined power-saving mode is, for example, a modern standby mode.

Note that, once the operating mode makes a transition from the initial start-up mode M2 to the normal mode M3, a transition from the power-saving mode M4 to the initial start-up mode M2 is prohibited.

Figure 7:
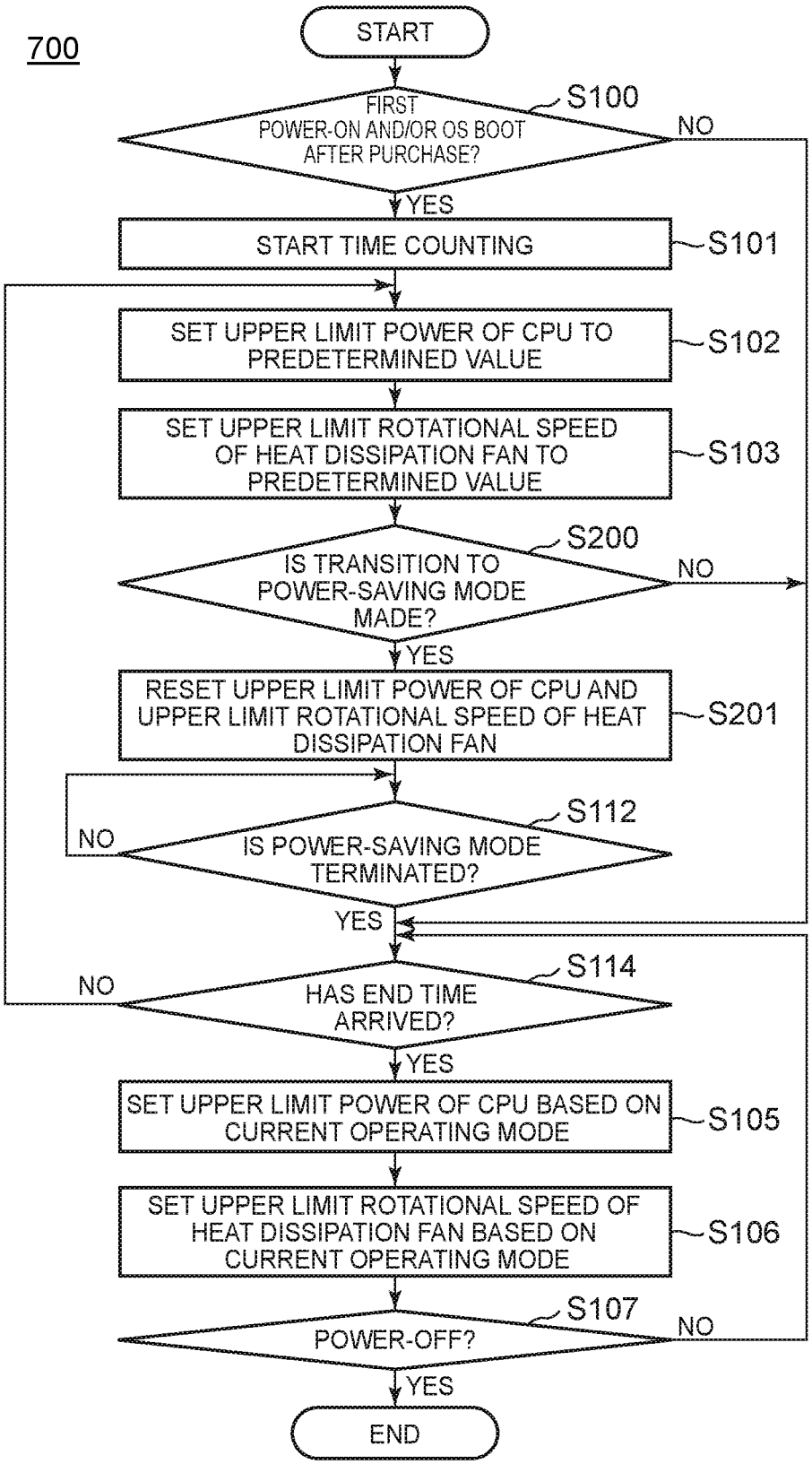
FIG. 7 is a flowchart diagram illustrating one embodiment of a method of controlling the power consumption of the CPU and the rotational speed of the heat dissipation fan for the operating modes embodiment depicted in FIG. 6.

FIG. 7 is a flowchart diagram illustrating one embodiment of a method 700 of controlling the power consumption of the CPU and the rotational speed of the heat dissipation fan for the operating modes embodiment depicted in FIG. 6. Certain steps of the method 700 (e.g., S100-S107) are performed substantially as described above with respects to the method 400 of FIG. 4 and the description is not repeated here.

As depicted in FIG. 7, after S103, the method 700 determines S200 whether an event trigger to make a transition to the power-saving mode M4 has occurred. When the event trigger to make the transition to the power-saving mode M4 has not occurred ("NO"), the method 700 proceeds to S114. When the event trigger to make the transition to the power-saving mode M4 has occurred ("YES"), the method 700 resets S201 the upper limit power of the CPU 11 to upper limit power corresponding to the power-saving mode M4. Further, the method 700 resets S201 the upper limit rotational speed of the heat dissipation fan 33 to an upper limit rotational speed corresponding to the power-saving mode M4. Then, the method 700 determines S112 whether the power saving mode is terminated. If ("YES"), the method 700 proceeds to processing step S114.

In certain embodiments, when the method 700 detects that the information processing device 1 makes a transition to a predetermined operating mode, the method 700 resets S201 the upper limit power of the CPU 11 and the upper limit rotational speed of the heat dissipation fan 33 even during the period in which the CPU 11 performs the initial setting mode processing. Thus, power consumption and heat generation of the execution unit of the information processing device 1 can be further suppressed.

Figure 8:
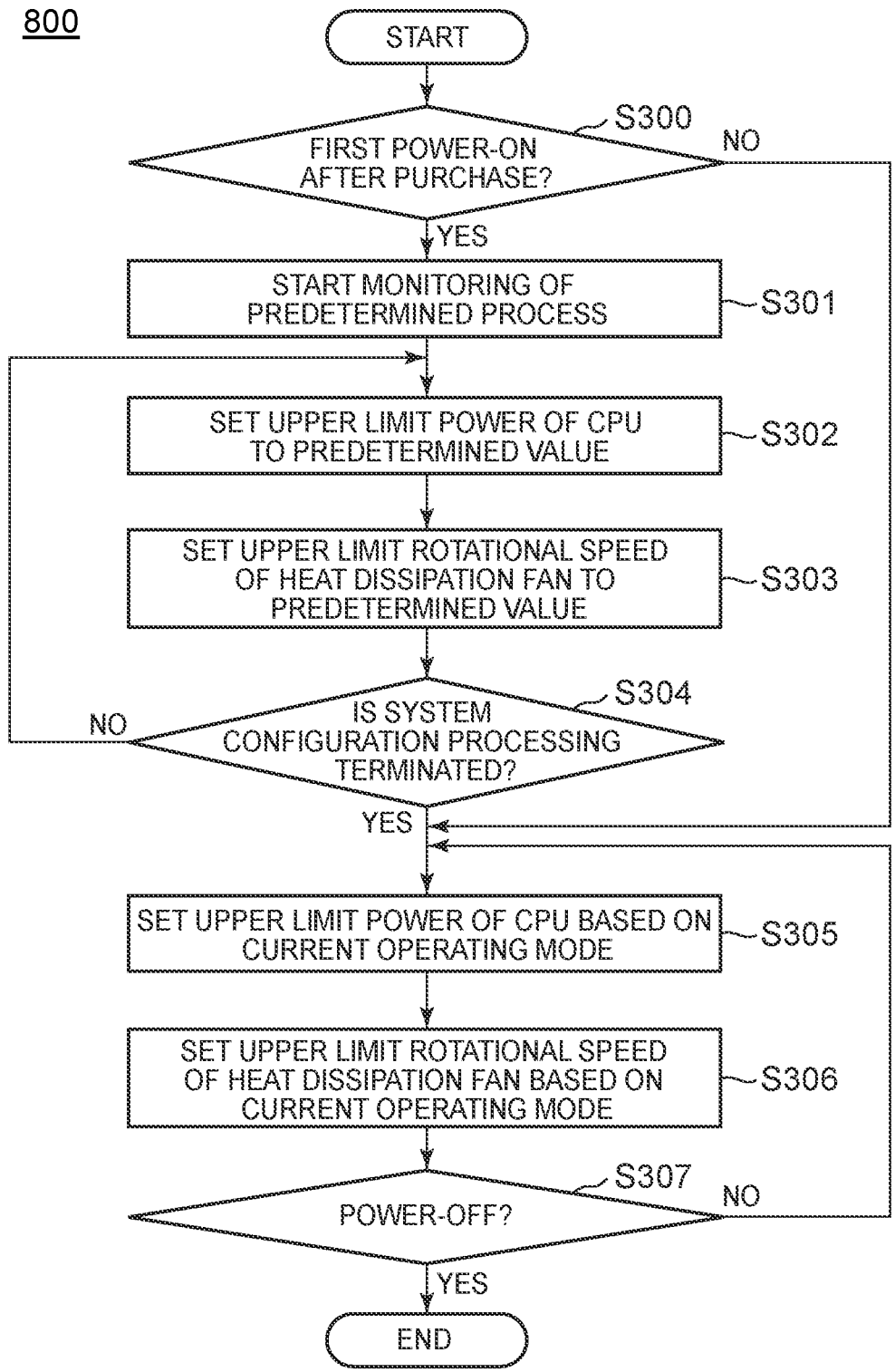
FIG. 8 is a flowchart diagram illustrating another embodiment of a method of controlling the power consumption of the CPU and the rotational speed of the heat dissipation fan for the operating modes embodiment depicted in FIG. 6.

FIG. 8 is a flowchart diagram illustrating another embodiment of a method 800 of controlling the power consumption of the CPU and the rotational speed of the heat dissipation fan for the operating modes embodiment depicted in FIG. 6. Note that parts identical to those in the embodiment of the method 700 depicted in FIG. 7 are given the same reference numerals to omit redundant description.

In the embodiment, the method 800 controls at least the power circuit 34 to make the amount of heat generation of the execution unit in the initial setting mode lower than the amount of heat generation of the execution unit in an operating mode after the termination of the initial setting mode until the end of processing related to the system configuration of the information processing device. The end of processing related to the system configuration of the information processing device is one example of the predetermined condition.

In various embodiments, processing related to the system configuration of the information processing device includes, for example, an OS update process, an index process, and a virus scan process among all processes to be executed in the initial setting mode. Each of these processes related to the system configuration is specified, for example, by the process name, and the start and end of the process are monitored by the CPU 11.

Moreover, in some embodiments, the processing related to the system configuration of the information processing device includes processes and operations executed in conjunction with the OS update process, the index process, and the virus scan process. The processes and operations executed in conjunction with the OS update process, the index process, and the virus scan process include, for example, a data download process by the network card 26, an arithmetic process on downloaded data by the CPU 11, and a storage process by the HDD 23 or the like. Therefore, in various embodiments of the method 700 as well as the method 800, the execution units include the network card 26, the HDD 23, and the like, as well as the CPU 11. Each of these processes and operations executed in conjunction with the processes related to the system configuration is also specified, for example, by the process name, and the start and end of the process are monitored by the CPU 11.

Although in some embodiments of the method 800, the suppression of heat generation is described with the CPU 11 as an execution unit, the method 800 in various embodiments also suppresses heat generation of any of the various types of execution units that execute the processes and operations related to the system configuration as described above.

The method 800 begin and determines S300 whether an event trigger as first power-on after purchase has occurred. When the event trigger as first power-on after purchase has not occurred ("No"), method 800 proceeds to S305. When the event trigger as first power-on after purchase has occurred ("YES"), the method proceeds to S301.

The method 800 starts S301 monitoring of predetermined processes. The predetermined processes are a process related to the system configuration, and a process associated with the process related to the system configuration. The method 800 continues and sets S302 the upper limit power of the CPU 11 to a predetermined value. As described above, in various embodiments, the predetermined value for the upper limit power is power lower than the reference power. The method 800 continues and sets S303 the upper limit rotational speed of the heat dissipation fan 33 to a predetermined value. In various embodiments as described above, the upper limit rotational speed is a rotational speed lower than the reference rotational speed.

The method 800 continues and determines S304 whether the process related to the system configuration and the process associated with the process related to the system configuration (system configuration processing) are terminated. When all the predetermined processes being monitored are terminated, the method 800 determines S304 that the system configuration processing is terminated. When the system configuration processing is not terminated ("NO"), the method 800 repeats S302 and S303. When the system configuration processing is terminated ("YES"), the method 800 continues to S305.

In some embodiments, the method 800 sets S305 the upper limit power of the CPU 11 based on a current operating mode. The method 800 continues and sets S306 the upper limit rotational speed of the heat dissipation fan 33 based on the current operating mode. The method 800 continues and determines S307 whether an event trigger as power-off has occurred. When the event trigger as power-off has not occurred ("NO"), the method 800 returns to processing step S305. When the event trigger as power-off has occurred ("Yes"), method 800 ends.

In various embodiments of the method 800, at least the power supply is controlled to make the amount of heat generation of the execution unit in the initial setting mode lower than the amount of heat generation of the execution unit in an operating mode after the termination of the initial setting mode until the end of the processing related to the system configuration. Thus, heat generation of various execution units of the information processing device 1 suppressed until the end of the processing related to the system configuration, and when the processing related to the system configuration is terminated, the operation of the CPU 11 can be returned to normal seamlessly. Further, when processing desired by the user is performed after the processing related to the system configuration is terminated, the information processing device delivers higher performance than the performance in the initial setting mode. Accordingly, in various embodiments the user satisfaction is high both before the start and after the end of the initial setting mode.

In certain embodiments, the method 800 suppresses heat generation in response to the fact that the event trigger as first power-on after purchase has occurred, but the present disclosure is not limited thereto. For example, the method 800 may perform S301 and subsequent steps by setting, as an event trigger, the fact that the network card 26 starts communication. This is because the start conditions of the OS update process and the virus scan process in the system configuration processing include network connection of the information processing device. This can cause the information processing device to avoid the degradation of performance in such a state that the network card 26 is not connected to an external device based on a user's operation.

In some embodiments, the method 800 described above suppresses the heat generation of the execution unit until the end of the system configuration processing, but the information processing device of a variation may determine that the system configuration processing is terminated when an instruction output from the OS performing the system configuration processing is accepted.

In such embodiments, a program running on the information processing device 1 in the above-described aspects of the present invention may be a program (e.g., causing a computer to function) for controlling one or more processors such as CPUs or the like to implement the functions illustrated in each of the above-described embodiments or variations according to the above-described aspects of the present invention. Information handled by each of these units may be accumulated in a RAM temporarily during the processing, then stored in any of various storages such as a flash memory, an HDD, or the like, and read by the CPU as necessary to modify/write the information.

Note that a part or the whole of methods 400, 700, and 800 is performed by a computer including one or more processors. In such embodiments, the computer records on a computer-readable recording medium, a program for implementing this control function, read the program recorded on this recording medium into a computer system, and execute the program to implement the methods 400, 700, and 800.

Note that the term "computer system" as used herein refers to a computer system incorporated in the information processing device 1, which includes hardware such as the OS, peripheral devices, and the like. Further, the "computer-readable recording medium" is a storage medium such as a flexible disk, a magnetooptical disk, a ROM, a portable medium like a CD-ROM, or a hard disk incorporated in the computer system.

Further, in certain embodiments the "computer-readable recording medium" dynamically holds the program for a short time like a communication wire when the program is transmitted through a network such as the Internet or a communication line such as a phone line, or to hold the program for a given length of time like a volatile memory inside the computer system as a server or a client upon transmission. Further, the above-described program may be to implement part of the above-described functions, or to implement the above-described functions in combination with a program already recorded in the computer system.

Further, a part or the whole of the information processing device 1 and/or the methods 400, 700, and 800 in each of the above-described embodiments is realized as an LSI that is typically an integrated circuit, or realized as a chipset. Further, each of the functional blocks of the information processing device 1 in each of the above-described embodiments and variations may be individually formed into a chip, some or all of the functional blocks may be integrated and formed into a chip. Further, the method of forming the integrated circuit is not limited to LSI, and the integrated circuit may be actualized by a dedicated circuit and/or a general-purpose processor. Further, if technology for forming the integrated circuit as an alternative to LSI appears as a result of the advancement of semiconductor technology, an integrated circuit based on the technology can be used.

In various embodiments, the structures, functions, and other features are practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an execution unit of an information processing device configured to execute an operation related to an initial setting mode of the information processing device;
   a power supply configured to supply power to one or more heat generating components of the execution unit; and
   a controller configured to control at least the power supplied by the power supply to make an amount of heat generation of the execution unit in the initial setting mode lower than the amount of heat generation of the execution unit in an operating mode after termination of the initial setting mode until fulfillment of a predetermined condition, wherein the fulfillment of the predetermined condition comprises elapsing of a period for the execution unit to perform initial setting mode processing after a first boot of the information processing device that includes booting an operating system in an initial state.

2. The apparatus of claim 1, wherein the fulfillment of the predetermined condition further comprises the execution unit terminating processing related to a system configuration of the information processing device.

3. The apparatus of claim 1, further comprising:
   a processor configured to perform initial setting mode processing,
   wherein the controller controls the power supply to make the power supplied to the processor lower than a reference power until the fulfillment of the predetermined condition.

4. The apparatus of claim 3, wherein
the execution unit includes a cooling fan that cools the processor, and
the controller controls the cooling fan to make a maximum rotational speed of the cooling fan lower than a reference upper limit rotational speed until the fulfillment of the predetermined condition.

5. The apparatus of claim 3, wherein the power supplied is set to limit a required increase in time for the processor to complete the initial setting mode processing with respect to a required time to supply the reference power to the processor in order to complete the initial setting mode processing to 10% or less.

6. The apparatus of claim 3, wherein the power supplied is 70% of the reference power or more.

7. The apparatus of claim 3, wherein the controller controls the power supplied so that an increase in time required for the processor to complete the initial setting mode with respect to the time required to supply the reference power to the processor in order to complete the initial setting mode falls within a predetermined range.

8. The apparatus of claim 1, wherein in response to the information processing device transitioning to a predetermined power-saving mode, the controller supplies, to the execution unit, power set in the predetermined power-saving mode including during the period for performing initial setting mode processing.

9. A method comprising:
supplying power to one or more heat generating components of an execution unit of an information processing device;
executing an operation related to an initial setting mode of an information processing device; and
controlling at least power supplied to the execution unit to make a first amount of heat generation of the execution unit in the initial setting mode lower than a second amount of heat generation of the execution unit in the different operating mode after termination of the initial setting mode until fulfillment of a predetermined condition, wherein the fulfillment of the predetermined condition comprises a period for the execution unit to perform initial setting mode processing elapsing after a first boot of the information processing device that includes booting an operating system in an initial state.

10. The method of claim 9, wherein the fulfillment of the predetermined condition further comprises terminating processing related to a system configuration of the information processing device.

11. The method of claim 9, further comprising controlling a cooling fan for cooling the execution unit to make a rotational speed of the cooling fan lower than a reference upper limit rotational speed until the fulfillment of the predetermined condition.

12. The method of claim 9, further comprising controlling the power supplied to limit a required increase in time for the processor to complete the initial setting mode with respect to a required time to supply the reference power to the processor in order to complete the initial setting mode to 10% or less.

13. The method of claim 9, further comprising controlling the power supplied to be 70% of the reference power or more.

14. A program product comprising a non-transitory machine readable storage medium that stores code executable by a processor, the executable code comprising code to:
supplying power to one or more heat generating components of an execution unit of an information processing device;
executing an operation related to an initial setting mode of an information processing device; and
control at least power supplied to the execution unit to make a first amount of heat generation of the execution unit in the initial setting mode lower than a second amount of heat generation of the execution unit in the different operating mode after termination of the initial setting mode until fulfillment of a predetermined condition, wherein the fulfillment of the predetermined condition comprises a period for the execution unit to perform initial setting mode processing elapsing after a first boot of the information processing device that includes booting an operating system in an initial state.

* * * * *